April 27, 1948.  C. B. NEEL  2,440,345
AIRCRAFT CARRIER
Filed May 2, 1944  2 Sheets-Sheet 1

INVENTOR
Carr Baker Neel

April 27, 1948.  C. B. NEEL  2,440,345
AIRCRAFT CARRIER
Filed May 2, 1944  2 Sheets-Sheet 2

INVENTOR
Carr Baker Neel

Patented Apr. 27, 1948

2,440,345

UNITED STATES PATENT OFFICE 2,440,345

AIRCRAFT CARRIER

Carr Baker Neel, Palo Alto, Calif.

Application May 2, 1944, Serial No. 533,681

11 Claims. (Cl. 114—43.5)

1

This invention relates to an aircraft carrier and has as several of its objects the provision of structure in an aircraft carrier that will give the carrier greater stability, efficiency, durability and capacity to perform desirable and necessary functions under all conditions than heretofore.

Another object is the provision of an aircraft carrier that has a greater capacity for handling airplanes both from the standpoint of the flight deck and from the standpoint of servicing and storage.

A still further object of the invention is the provision of an improved hull structure that increases the stability of the carrier under all conditions and that reduces the likelihood of the carrier being incapacitated for take-offs and landings and for maneuvering to a negligible degree.

Other objects and advantages will appear in the description and in the drawings.

Figure 1:
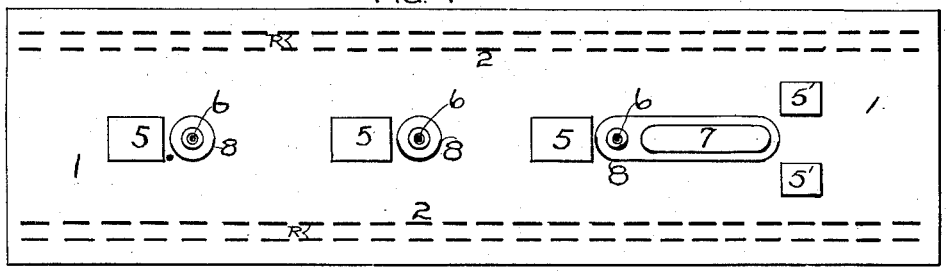
Fig. 1 is a plan view of the flight deck of a carrier illustrative of the present invention.

In detail the flight deck 1 (Fig. 1) is divided into three sections, there being a flight strip 2 along each of the opposite sides of the carrier and a central section or island between the strips 2. Flight strips 2 and said central section extend longitudinally of the carrier and the pair of dotted lines extending longitudinally of each flight strip, as seen in Fig. 1, mark the center of runways for the airplanes in landing or in taking off. These runways are so positioned as to provide a wide clearance between the tips of the large four-motor bombers and the central section.

In the central section are main elevators 5, towers 6, and smokestack 7 arranged in a row extending longitudinally of said section, and a pair of auxiliary elevators 5' are in side by side spaced relation about the smokestack 7, which smokestack is the rear element in the aforesaid row of mentioned elements that is in said central section.

2

The towers 6 may comprise platforms at different levels, the lowest one in each being designated 8 and which towers, for reasons later apparent, may be much higher than heretofore without detrimentally affecting the stability of the carrier.

The provision of the two wide flight strips on the flight deck, which flight strips are free from elevators or other obstructions for the length of the carrier enables the use of one of them for landings and take-offs, while the other may be used for parking and for repairing and servicing idle airplanes. As the strips are identical either or both may be used for the same kind of uses.

The elevators and towers being in the center section of the flight deck between the flight strips are out of the runways and flight strips and in this central section all desirable airplane servicing equipment may be positioned as well as fire fighting equipment for the carrier itself and for the airplanes.

Below the flight deck 1 are superposed hangars 3, 4 (Figs. 2, 4) for airplanes, the hangars 3 being uppermost. The elevators 5, 5' communicate with the hangars for transporting the airplanes to and from the hangars as desired.

Figure 4:
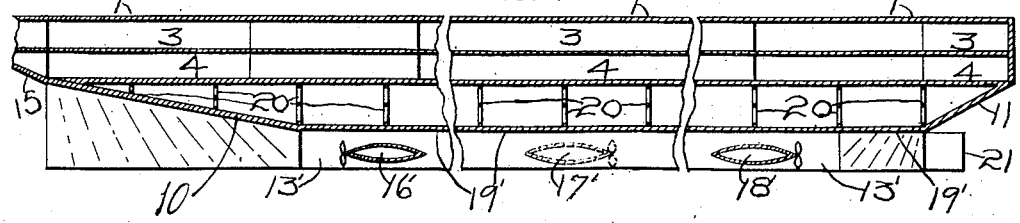
Fig. 4 is a slightly enlarged sectional view (broken in length) taken along line 4—4 of Fig. 3.
Figure 5:
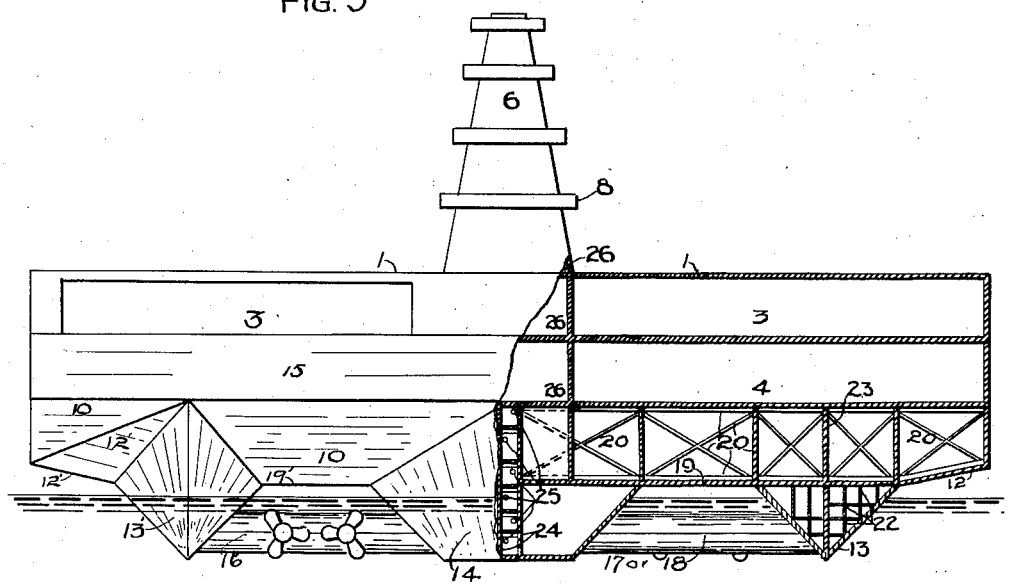
Fig. 5 is an enlarged part sectional, part elevational view of the carrier as seen from the front end thereof, the sectioned portion being substantially along line 5—5 of Fig. 3.

Immediately below the hangars 4 and normally above the waterline, as will later be described, is a hollow bottom having transverse bracing 20 therein (Figs. 4, 5). The lower side of said hollow bottom includes watertight inclined outer skins 10, 11, 12, 12', and the horizontal skins 19, 19' which will later be described more in detail and which form part of the bottom of the carrier.

Sections 26 may be in the armored bases of towers 6 in which sections the bombs and torpedoes may be racked awaiting use.

In addition to the skins mentioned in the preceding paragraph, the bottom of the carrier comprises three hulls 13, 13', and 14. The hulls 13, 13' extend longitudinally of the vessel adjacent but spaced inwardly from opposite sides thereof, and the hull 14 is parallel with hulls 13, 13' and spaced midway between them. Hull 14 is preferably exactly below the longitudinal axis of the carrier.

Figure 3:
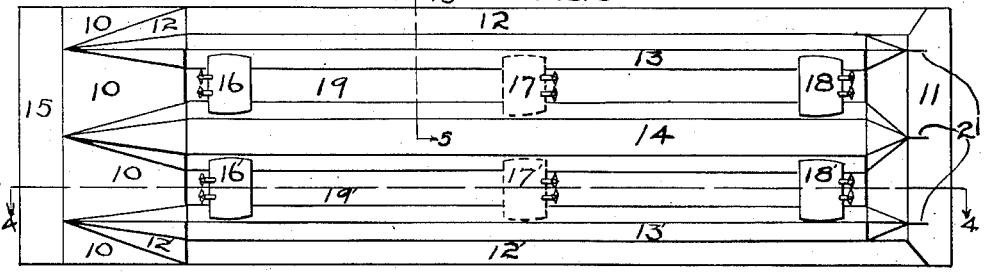
Fig. 3 is a bottom plan view of the carrier of Fig. 1.

The hulls 13, 13' may have convergently downwardly inclined sides terminating in a relatively sharp keel (Fig. 5) while the main central hull is preferably formed with a flat bottom, the said central hull being considerably wider than hulls 13, 13' inasmuch as it contains vital machinery and essentials whereas the hulls 13, 13' are principally for protection of the central hull 14 and for buoyancy. The sides of the central hull 14 preferably extend divergently upwardly from the side edges of its flat bottom (Fig. 5). The slanted sides of the hulls 13, 13' preferably come together at the stern and stem ends of said hulls to form more or less conventional cut-waters at said ends, and the sides and bottom of the central hull taper to meeting relation at their stem and stern ends as seen in Fig. 3.

The horizontal skins 19, 19' extend between the upper ends of hulls 13, 13' and 14 and coact with the adjacent sides of hulls 13, 14 and 13', 14 to form the tops of a pair of tunnels with said adjacent sides forming the opposite sides of each tunnel (Fig. 5).

Figure 2:
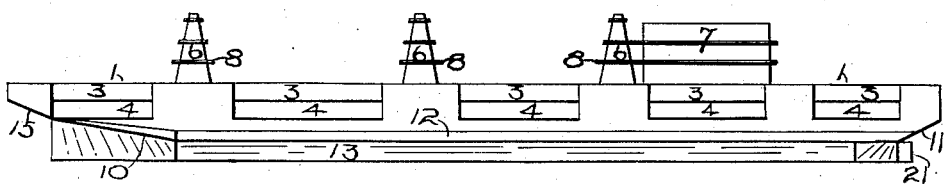
Fig. 2 is a side elevational view of the carrier of Fig. 1.

The skin 10 extends slantingly upwardly from the forward ends of skins 19, 19' (Fig. 4) while skin 11 extends slantingly upwardly from the stern ends of 19, 19'. Skins 12, 12' extend slantingly upwardly from the outermost sides of the upper ends of hulls 13, 13' (Fig. 5) and a forward and upward continuation 15 of the skin 10 extends to the bow end of the deck of hangar 3 (Figs 2, 4). The tapered forward ends of the hulls 13, 13' and 14 extend across and below the skin 10 (Figs. 2 to 5).

Each of the skins 10, 11, 12, 12', 19, 19' is preferably flat altho all of them, except skins 19, 19', are inclined as has been described and all of said skins are normally spaced above the waterline, with 12, 12' relatively close thereto and with 19, 19' so located as to attain the best results under the conditions desired.

Bulkheads 23 may extend through the main buoyant, hollow bottom in which bracings 20 are positioned and the keel of each hull 13, 13' (Fig. 5) and which bulkheads preferably extend centrally through hulls 13, 13' from stem to stern thereof. The bulkhead 23 in hull 13 is the only one shown, it being understood that the same structure is in hull 13'. Also hulls 13, 13' may be divided by walls 22 into compartments (Fig. 5).

A double bulkhead centrally in 24 in hull 14 may extend longitudinally of said hull from stem to stern thereof and through the hollow bottom of the carrier for stiffening the ship and to afford protection for power cables 25 etc.

A rudder 21 is at the stern end of each of the hulls 13, 13', 14.

The transverse girders 20 may serve to tie the hulls 13, 13', 14 together as well as to strengthen the body of the carrier against strains.

Propeller supports or housings 16, 16' extend between hulls 13, 14 and between hulls 13', 14 adjacent their bow ends while similar housings 17, 17' may, if desired, extend between said hulls amidship while stern propeller supports or housings 18, 18' extend between said hulls adjacent their stern ends.

Figure 6:
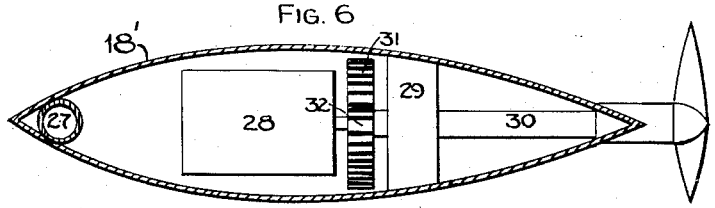
Fig. 6 is an enlarged sectional view taken substantially centrally through one of the stern propeller supports in a direction longitudinally of the carrier.

These propeller supports are normally submerged and are spaced below the skins 19 (Figs. 4, 5) and a high pressure pipe 27 may be provided in stern propeller housings 18, 18' (Fig. 6) for water leading from the main central hull 14 to power jets (not shown) placed in the outside of the hulls 13, 13' to assist in rapid maneuvering.

Figure 7:
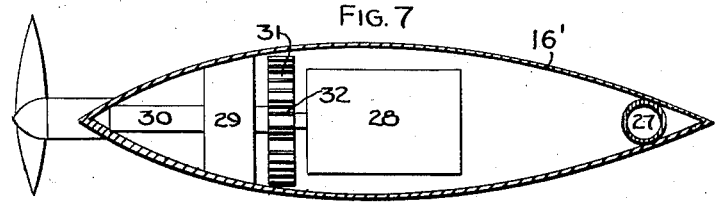
Fig. 7 is an enlarged sectional view taken substantially centrally through one of the bow propeller supports in a direction longitudinally of the carrier.

In each of the housings 16, 16', 18, 18' (and 17, 17' when used) is preferably a pair of motors 28 (only one being shown in Figs. 6, 7) which motors drive a bull wheel 31 by means of pinions 32. Bull wheel 31 drives the propeller shaft 30. A thrust block support 29 may be provided through which the thrust of the propeller is transmitted to the ship.

The particular advantage of the propeller supports as shown is that they permit the use of very short propeller shafts thus reducing the number of bearings required with a corresponding reduction in friction. The total length of eight propeller shafts (two for each of the housings 16, 16', 18, 18') is less than half the length of the shafting required by a quadruple screw vessel of the same size.

The two motors in each of the housings 16, 16', 18, 18' (and 17, 17' when used) are preferably geared to each propeller shaft which permits the use of smaller motors revolving at a higher speed.

The propeller shafts in my housings are parallel to the center line of the carrier and their propellers thus always have the same pitch as they revolve, instead of having their propellers constantly changing their pitch as is the case when propeller shafts make an angle with the center line of their hull. This method of supporting propeller shafts with their propellers has many advantages when used with multi-hulled ships. A larger number of propellers can be used with maximum efficiency and larger sized propellers can be used, while the housings function to brace the hulls and assist in tying them together and in holding them in correctly spaced relation as the stresses change.

By the foregoing structure it will be seen that the likelihood of the carrier capsizing, sinking or of listing to a degree where the airplanes cannot land or take-off is substantially eliminated.

The hulls 13, 13' protect the central hull against damage, the hollow bottom above the hulls and above the water line in which bracings 20 are seen provide a large reserve of buoyancy in the event of any damage to the hulls 13, 13', or 14.

The spacing of the hulls 13, 13', 14 which is relatively wide insures stability for the superstructure and makes possible the several wide flight strips and the central section between them and the large capacity for airplanes in the hangars. Said hulls also make the use of taller towers possible by reason of the great stability they afford.

The skins 12 and 12' that are below the overhanging superstructure outwardly of the hulls 13, 13' contribute especially to the safety and stability of the carrier while the housings 16, 16', 18, 18', and if used, 17, 17', contribute to the steadiness of the carrier in acting as stabilizers that dampen both the pitching and the rolling. The inclined plane 10 limits pitching.

I claim:

1. An airplane carrier having a main body portion provided with a watertight bottom skin, a row of horizontally elongated hulls in side by side spaced parallel relationship connected directly with and projecting downwardly from said skin for supporting said body above the water, said skin and body projecting equal and substantial distances laterally outwardly and upwardly from the outside hulls of said row, 2. An airplane carrier having a horizontally elongated main body portion and a watertight bottom skin, three horizontally elongated equally spaced hulls in side by side parallel relationship adjoining said skin and connected therewith and projecting downwardly therefrom, the central hull extending centrally below the said body portion and parallel with its longitudinal axis, the said skin and body projecting laterally outwardly from each of the hulls at opposite sides of said central hull for a substantial distance and relatively close to the water line when said carrier is in the water for restricting the list of said carrier to a relatively small degree in the event of loss in the buoyancy of one or the other of said outer pair of hulls.

3. An airplane carrier having a horizontally elongated main body portion provided with a watertight bottom skin, said skin including a horizontal flat central portion and a bow and stern portion extending slantingly upwardly from the bow and stern edges of said central portion and side portions extending slantingly upwardly from the side edges of said central portion, a plurality of elongated hulls in side by side spaced relation projecting downwardly from said central portion for supporting said skin spaced above the water line when said carrier is in the water.

4. An airplane carrier having a main body portion provided with a pair of horizontally elongated hulls in spaced side by side relationship secured thereto and projecting downwardly therefrom for supporting said body portion above the water when said carrier is in the water, a pair of housings respectively adjacent opposite ends of said hulls respectively connected to said hulls at their opposite ends, propeller shafts respectively extending through each of said housings, a propeller on the other end of each shaft between said hulls, and separate means respectively in each housing for rotating the shaft extending therethrough.

5. An airplane carrier having a main body portion provided with a pair of horizontally elongated hulls in spaced side by side relationship secured thereto and projecting downwardly therefrom for supporting said body portion above the water when said carrier is in the water, a pair of housings respectively adjacent opposite ends of said hulls respectively connected to said hulls at their opposite ends, propeller shafts respectively extending through each of said housings, a propeller on the other end of each shaft between said hulls, and separate means respectively in each housing for rotating the shaft extending therethrough, each of said housings being spaced below said body, and said shafts being parallel with each other and with the longitudinal axes of said hulls.

6. An airplane carrier having a main body portion provided with three horizontally elongated parallel hulls in spaced relation secured thereto and projecting downwardly therefrom, the central hull being relatively large as compared with the other two at opposite sides thereof, propellers disposed between the adjacent pairs of said hulls for driving the carrier, housings extending between said adjacent pairs of hulls and secured thereto for supporting said propellers for rotation, and means in said housings including a propeller shaft secured to each propeller for connecting the respective propellers with a source of power.

7. An airplane carrier having a main body portion provided with three horizontally elongated parallel hulls in spaced relation secured thereto and projecting downwardly therefrom, the central hull being relatively large as compared with the other two at opposite sides thereof, propellers disposed between the adjacent pairs of said hulls for driving the carrier, housings extending between said adjacent pairs of hulls and secured thereto for supporting said propellers for rotation, and means in said housings including a propeller shaft secured to each propeller for connecting the respective propellers with a source of power, said housings being spaced below said body and the said propeller shafts being parallel with the longitudinal axes of said hulls.

8. An airplane carrier having a main body portion provided with three horizontally elongated parallel hulls in spaced relation secured thereto and projecting downwardly therefrom, the central hull being relatively large as compared with the other two at opposite sides thereof, propellers disposed between the adjacent pairs of said hulls for driving the carrier, housings extending between said adjacent pairs of hulls and secured thereto for supporting said propellers for rotation, and means in said housings including a propeller shaft secured to each propeller for connecting the respective propellers with a source of power, the central hull being relatively wide compared with the widths of the respective hulls at either side thereof and having a flat bottom, the said hulls at either side of said central hull being of equal size and shape and each being formed with a relatively sharp keel.

9. In an airplane carrier having a main body portion provided with a pair of horizontally elongated hulls in spaced parallel relationship secured thereto and projecting downwardly therefrom for supporting said body portion above the water when the carrier is in the water, an underwater housing connecting each of said pair of adjacent hulls near one of their ends, a propeller shaft rotatably extending through each of said housings and supporting a propeller thereon in the space between said hulls, and means within said housing for rotating said shaft.

10. In an airplane carrier having a main body portion provided with a pair of horizontally elongated hulls in spaced parallel relationship secured thereto and projecting downwardly therefrom for supporting said body portion above the water when the carrier is in the water, an underwater housing connecting each of said pair of adjacent hulls near one of their ends, a propeller shaft rotatably extending through each of said housings and supporting a propeller thereon in the space between said hulls, and means within said housing for rotating said shaft, said housing being spaced below said body.

11. In an airplane carrier having a main body portion provided with a pair of horizontally elongated hulls in spaced parallel relationship secured thereto and projecting downwardly therefrom for supporting said body portion above the water when the carrier is in the water, an underwater housing connecting each of said pair of adjacent hulls near one of their ends, a propeller shaft rotatably extending through each of said housings and supporting a propeller thereon in the space between said hulls, and means within said housing for rotating said shaft, said shaft being parallel with the longitudinal axes of said hulls.

CARR BAKER NEEL.

REFERENCES CITED

The following references are of record in the file of this patent:

UNITED STATES PATENTS

| Number | Name | Date |
|---|---|---|
| 33,598 | Pardee | Oct. 29, 1861 |
| 116,024 | Clenny | June 20, 1871 |
| 255,599 | Coppin | Mar. 28, 1882 |
| 2,266,615 | Scott-Paine et al. | Dec. 16, 1941 |
| 2,325,993 | Zoll | Aug. 3, 1943 |
| 2,381,583 | Fechtenberg | Aug. 7, 1945 |

FOREIGN PATENTS

| Number | Country | Date |
|---|---|---|
| 503,232 | France | Mar. 11, 1920 |
| 824,885 | France | Nov. 18, 1937 |

OTHER REFERENCES

Popular Mechanics, pages 62 and 63, Feb. 1943.
Scientific American, page 339, Oct. 2, 1920.